United States Patent [19]

Marx

[11] Patent Number: 4,574,674

[45] Date of Patent: Mar. 11, 1986

[54] SHEARING MACHINE FOR CUTTING UP MISCELLANEOUS MATERIAL

[75] Inventor: Helmut Marx, Düsseldorf, Fed. Rep. of Germany

[73] Assignee: Lindemann Maschinenfabrik GmbH, Düsseldorf, Fed. Rep. of Germany

[21] Appl. No.: 592,864

[22] Filed: Mar. 23, 1984

[30] Foreign Application Priority Data

Mar. 25, 1983 [DE] Fed. Rep. of Germany ....... 3310894

[51] Int. Cl.[4] ............................................. B26D 1/00
[52] U.S. Cl. .................................... 83/698; 100/214; 403/261
[58] Field of Search ................. 83/639, 698, 699, 700; 403/326, 259, 261; 100/214; 411/368, 378, 376, 517, 353

[56] References Cited

U.S. PATENT DOCUMENTS 765,139   7/1904  Hirsch ................................. 411/368
3,279,297 10/1966 Smiltneek ............................. 83/698

FOREIGN PATENT DOCUMENTS 18523 10/1955 Fed. Rep. of Germany ...... 100/214

Primary Examiner—Douglas D. Watts
Attorney, Agent, or Firm—Toren, McGeady, Stanger, Goldberg & Kiel

[57] ABSTRACT

A shearing machine for cutting up material of any kind comprises a shearing blade carrier which is vertically slidable in a closed frame, being moved by a cylinder-piston assembly fixed in a crosshead of the frame. In order to simplify assembly and dismantling of the cylinder, the cylinder which is fixed in the crosshead, is supported against reaction forces from the blade carrier towards the crosshead by a divided ring on the side of the crosshead facing towards the blade carrier, the divided ring, engaging in a circumferential recess in the outside of the cylinder surface and also partly into an opening in the side of the crosshead facing towards the blade carrier and the cylinder is also fixed, on the side of the crosshead remote from the blade carrier by a second ring which bears against the crosshead with a prestress so that the cylinder is held under tension in the crosshead between the two rings.

11 Claims, 5 Drawing Figures

SHEARING MACHINE FOR CUTTING UP MISCELLANEOUS MATERIAL

BACKGROUND OF THE INVENTION

This invention relates to a shearing machine for cutting up miscellaneous material, for example scrap metal, waste, refuse, bars, strands or cordage. The machine includes a shearing blade carrier which is slidably guided in a closed frame. It may also include a holding-down device. The blade carrier and the holding down device, when provided, each have a drive comprising a cylinder-piston assembly fixed in an opening through a crosshead.

DESCRIPTION OF THE PRIOR ART

In the crosshead of a vertically acting shearing machine, two drive cylinders are usually housed alongside one another. One cylinder is connected via its piston with a main shearing blade carrier and the other constitutes the drive of a so-called holding-down device, which holds down and fixes the material to be cut during the shearing operation. The cylinder associated with the holding-down device is, on account of the smaller force which it has to produce, substantially smaller than the other cylinder designated as the shearing cylinder. Apart from their size, the cylinders do not differ in principle from each other. The following description therefore applies equally to the shearing cylinder and the holding-down cylinder, even though only the shearing cylinder is described.

The cylinders fixed in the crosshead are subjected to two forces oriented in their axial direction. Normally, only the weight of the drive units and accessories acts on the cylinders. This is accepted by a shoulder extending around the cylinder resting on the edge of the opening in the crosshead. For accepting the much larger, upwardly acting shearing force, in the known shearing machines a screw threaded ring is used which, after the cylinder has been inserted into the crosshead opening, is pushed onto the cylinder from below and is screwed onto a thread on the cylinder. The considerable shearing forces are therefore transmitted from the cylinder via the screwthread and the screwthread ring to the crosshead.

In order to eliminate any play in the direction of the cylinder axis between the cylinder and the crosshead and to prevent loosening of the screwthreaded ring, this ring is held under prestress by a stressing system.

On account of the operational fluctuating loading associated with the shearing operation, due to the shearing force on the one hand and the sudden release after cutting through on the other hand, the screwthread of the threaded ring holding the cylinder is so heavily stressed that, after some time in operation, damage to the thread both of the ring and also of the cylinder occurs. Thus the prestress of the threaded ring decreases until it disappears and the considerable forces acting alternately in opposite directions on the cylinder finally lead to an upward and downward movement of the cylinder of the order of some millimeters.

Since the necessary repairs cannot usually be put in hand, on account of the heavy duty of shearing machines as initially described, the effect of the forces, amounting to hundreds of tons, acting upon the threaded ring is that the threaded ring works into the adjacent surface of the crosshead. This connection is finally so firmly jammed in the crosshead due to deformation between the threaded ring and the cylinder that the cylinder has to be removed to permit the construction of a new thread. For this purpose the threaded ring must be burnt away, so that here again a new threaded ring must be procured. Furthermore, a repair to the surface surrounding the opening in the crosshead, into which the threaded ring had worked, is necessary. These operations are expensive and necessitate a downtime of about four weeks.

SUMMARY OF THE INVENTION

The object of the present invention is to provide a less sensitive fixing for the drive cylinder or cylinders of a machine as initially described and to facilitate the installation and removal of the shearing cylinder and/or the holding down cylinder of a shearing machine suitable for material of any type, especially metal scrap, in conjunction with at least equivalent operational reliability and durability.

According to this invention a shearing machine for cutting up miscellaneous material, for example, scrap metal, waste, refuse, bars, cordage or the like, comprising a shearing blade carrier which is slidably guided in a closed frame and a drive for reciprocating the blade carrier, the drive comprising a cylinder-piston assembly fixed in an opening through a crosshead of the frame is characterised in that the cylinder is supported to counteract reaction forces from the blade carrier towards the crosshead, against the side of the crosshead which faces towards the blade carrier by a divided ring, which engages in a circumferential recess in the outside of the cylinder and also at least partly in the opening in the side of the crosshead facing towards the blade carrier and means is provided to fix the cylinder on the side of the crosshead remote from the blade carrier, this means bearing with a prestress against the side of the crosshead remote from the blade carrier.

In this way, the end fixing means of the cylinder accepting the prestress is relieved from the high forces acting during operation of the shearing machine and moreover the fixing means are situated at a position much more readily accessible for installation and dismantling than in the shearing machines at present in use. In particular in the case of vertical shears, the invention offers especial advantages, since installation can now be carried out substantially without overhead work.

Preferably, the cylinder is supported, at the side of the crosshead remote from the blade carrier, by means of a screwthreaded ring screwed onto the circumference of the cylinder or of a second divided ring, which engages in a further circumferential recess in the outside of the cylinder.

Accordingly, the invention consists in principle in providing, in place of the screw thread which hitherto received the screwthreaded ring, an annular recess or groove in the external surface of the cylinder and in replacing the screwthreaded ring having a centering projection, by an unthreaded, divided, preferably bisected, ring, which is fitted into the recess and, for accepting the reaction forces during shearing, projects with its end face which is towards the crosshead sufficiently far radially outwards beyond the edge of the opening which holds the shearing cylinder and bears, with its end face which faces towards the blade carrier, against the shoulder forming the boundary of the recess in the cylinder or against the thus formed flange at the end of the cylinder. The recess must therefore be cut sufficiently deep for the flange of the cylinder which adjoins it to be capable of receiving the entire reaction from the shearing blade. With the invention, therefore, the result is achieved that the aforementioned shoulder of the recess or of the flange adjoining the recess of the cylinder replaces the thread hitherto necessary at this position.

In order to fix the divided ring in position, the recess is so formed in the cylinder surface that it extends at least partly into the opening in the crosshead when the cylinder is fixed in position. In the lower part of the opening in the crosshead, a circumferential recess or seating may likewise be provided, which seats the parts of the divided ring projecting radially beyond the cylinder surface, so that the crosshead opening is of stepped construction. In this manner the divided ring can also be recessed entirely in the crosshead in the prestressed position of the cylinder. By the partial or complete recessing of the divided ring in the opening in the crosshead, the divided ring is fixed in the radial direction. Preferably, the divided ring has at least one centering projection projecting into the opening, the maximum diameter of which projection is equal to the diameter of the cylinder. It is then sufficient so to dimension the recess in the cylinder surface that the centering projection extends into the crosshead opening when the cylinder is prestressed.

For accepting the cylinder weight and prestressing the cylinder against the abutment formed by the divided ring, a screwthreaded ring screwed on to a thread on the cylinder circumference on the side of the crosshead remote from the blade carrier is preferably used. This threaded ring can bear with its end face flatly upon the crosshead in the region of the circumference of the opening which holds the cylinder. Since the threaded ring on this side of the crosshead need accept only considerably smaller forces than the threaded ring which was previously provided on the side of the crosshead adjacent the blade carrier, it can be of correspondingly more slender construction. Centering of the cylinder in the region of this threaded ring is achieved by a fit at the circumference of the cylinder corresponding to the diameter of the opening. Instead of such a fit at the cylinder circumference, however, a centering projection of the screwthreaded ring extending into the bore of the crosshead may be provided.

For fixing the cylinder on the side of the crosshead remote from the blade carrier, other means may be used instead of the screwthreaded ring. For example, the end fixing of the cylinder which generates the prestress on the side of the crosshead remote from the blade carrier may be formed by the aforementioned, second divided ring. This second divided ring can likewise extend into a circumferential recess in the outside of the cylinder. Preferably, the second divided ring is held together by means of a single-piece banding ring. The installation of the second divided ring is preferably carried out with prestressing pressure produced by means of wedges driven radially inwards. Each wedge is advantageously fixed by means of a weld, in order to prevent releasing or loosening. Since the connection in accordance with this invention cannot become loose if installation is properly carried out, a restressing facility is not necessary and the welding of the wedges does not constitute any disadvantage.

For example, in a vertically standing shearing machine, in order to mount the shearing cylinder or the holding-down cylinder, the relevant cylinder is inserted from above into the opening provided in the crosshead. For this purpose the abutment formed, for example, as a threaded ring on the upper face of the crosshead is screw upwards sufficiently far from its final position for the divided ring on the lower side of the crosshead to be introduced without difficulty into the recess in the cylinder provided for this purpose. The cylinder is then first slightly raised, for example by means of a crane used for installation, so that the threaded ring on the upper side of the crosshead can be temporarily tightened. If the aforementioned spatial associations of recess, divided ring and crosshead are maintained, the divided ring partly enters the opening in the crosshead or a circumferential recess provided at the end of the opening when the threaded ring is thus lightly tightened up, so that the divided ring is fixed in the radial direction. In the axial direction the divided ring cannot be moved, because in its axial length it is exactly adapted to the dimensions of the recess.

For the final tightening or prestressing of the threaded ring provided on the upper face of the crosshead, the cylinder is connected to its pressure lines and is pressurized with fluid, so that the blade carrier of the machine which is coupled to the cylinder piston is extended as far as a stop. The blade carrier is then pressed with maximum force against the stop, so that the divided ring is forced upwards and the threaded ring on the upper face of the crosshead can be tightened without great expenditure of force with the prestress required for operation.

In the form of construction according to the state of the art, the prestressing for tightening of the threaded ring was achieved by the extended blade carrier being mechanically blocked in the frame in such a manner that it was prevented from pulling back, so that the hydraulic pulling-back force of the cylinder acted upon the cylinder in a direction towards the blade carrier and made possible tightening of the threaded ring. This procedure, imposed by the design, had the disadvantage, however, that only the so-called annular force or rod end force on the piston minus the piston rod cross-section area and not the entire piston area was available. Therefore, with the conventional form of construction, only a very much smaller prestressing force could be achieved. For this reason loosening of the connection by movements under extreme loadings of the shearing blades could occur. Since the cylinder fixing in accordance with this invention can be prestressed and established under maximum shearing force, higher pressures and resulting forces which might lead to damage of such a connection, are excluded right from the start.

Dismantling is carried out in the reverse sequence to assembly. For releasing the threaded ring, the blade carrier is first pressed with the maximum possible force against the abutment, so that the prestress acting upon the threaded ring is considerably reduced and complete releasing of the threaded ring is possible without great difficulty. After the divided ring has been removed, the cylinder can be pulled out upwards from the opening in the crosshead.

BRIEF DESCRIPTION OF THE DRAWINGS

Two examples of machines in accordance with the invention are illustrated diagrammatically in the accompanying drawings in which.

DESCRIPTION OF THE PREFERRED EXAMPLES

Figure 1:
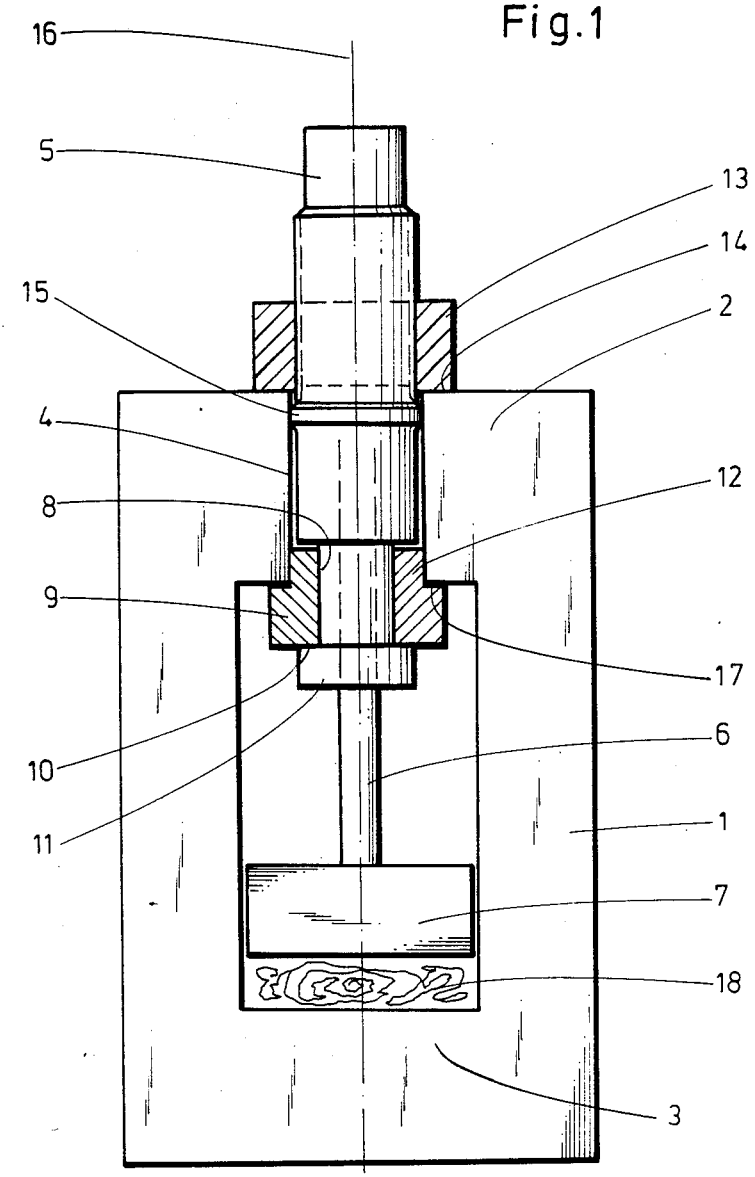
FIG. 1 is a vertical section through one example.

A machine shown in FIG. 1 comprises a frame 1, having a crosshead 2 and a fixed, counterknife 3 disposed in the lower part of the frame. A shearing cylinder 5 is fixed in an opening 4 in the crosshead 2. Its associated piston 6 drives a blade carrier 7, as seen in the direction of FIG. 1; behind or in front of the shearing cylinder 5, there is also a cylinder together with piston for driving a holding-down device. The holding-down cylinder is also fixed in a bore in the crosshead 2. The holding-down cylinder and piston, which are not shown, are except for their dimensions constructed the same as the shearing cylinder and piston. The same applies also for the fixing described below of the cylinder, which is explained with reference to the fixing of the shearing cylinder.

The shearing cylinder 5 has in its outside surface a circumferential recess 8 which, when the cylinder 5 is stressed and fixed, projects partly into the opening 4 in the crosshead 2. Into this recess 8 there is inserted a divided ring 9, for example a bisected ring, which rests against a lower shoulder 10 of the recess 8, that is on a flange 11 of the cylinder 5 adjoining the recess 8. The divided ring 9 has, towards its top, a projection or stub 12 formed by machining, which has virtually the same external diameter as the diameter of the opening 4 and therefore serves both for radially fixing the divided ring 9 and for centering the cylinder 5.

Whereas the divided ring 9 on the lower face of the crosshead 2 is designed for accepting the reaction forces oriented upwards from the blade carrier 7, a screwthreaded ring 13, which is screwed on to the circumference of the cylinder 5 above the crosshead 2, serves for withstanding the downwardly oriented forces, that is in particular the weight of the cylinder 5 and the blade carrier 7. The screwthreaded ring 13 lies flatly, preferably with a flat end face 14, against the region around the opening 4 in the crosshead 2. On account of the flat seating surface, jamming or wedging cannot take place at this position. If an accurate centering is necessary here, the cylinder circumference can be furnished with an appropriate collar 15 which fits exactly in the opening 4. Instead of this, the threaded ring 13 may also possess a centering projection or stub extending in to the opening 4.

During assembly, the cylinder 5, which is aligned with the longitudinal axis 16 of the opening 4, is introduced vertically from above into the opening until the recess 8 projects entirely out of the opening on the lower side of the crosshead 2. Thereupon the divided ring 9 is inserted from the sides into the recess 8 and the cylinder 5 is slightly raised, so that the projection or stub 12 on the divided ring 9 enters the bore 4 and the divided ring bears with its upper shoulder 17 against the lower face of the crosshead 2. The ring 9 is thus fixed in the axial and radial directions. The screwthreaded ring 13 on the upper face of the crosshead 2 is then tightened up sufficiently for the stub 12 of the divided ring 9 to remain at least partly in the bore 4. The pressure pipes are then fitted to the cylinder 5 and the cylinder is pressurised so that the blade carrier is pushed downwards against an abutment 18 and exerts a corresponding reaction force on the cylinder 5 and thus, via the divided ring 9, on the crosshead 2. Under this prestress, the screwthreaded ring 13 is then further tightened, so that the cylinder 5 is fixed under prestress in the desired position.

During dismantling of the cylinder 5, basically the reverse sequence is used to that for installation. Dismantling starts with the cylinder being pressed upwards by loading as in shearing with an extremely high force, so that the screwthreaded ring 13 may be loosened. Thereupon the cylinder 5 is lowered sufficiently far for the separate parts of the divided ring 9 to be removed from the recess 8. Finally, the cylinder 5, after the knife slide 7 has been uncoupled, is pulled out in a vertical direction 16 completely out of the bore 4.

Figure 2:
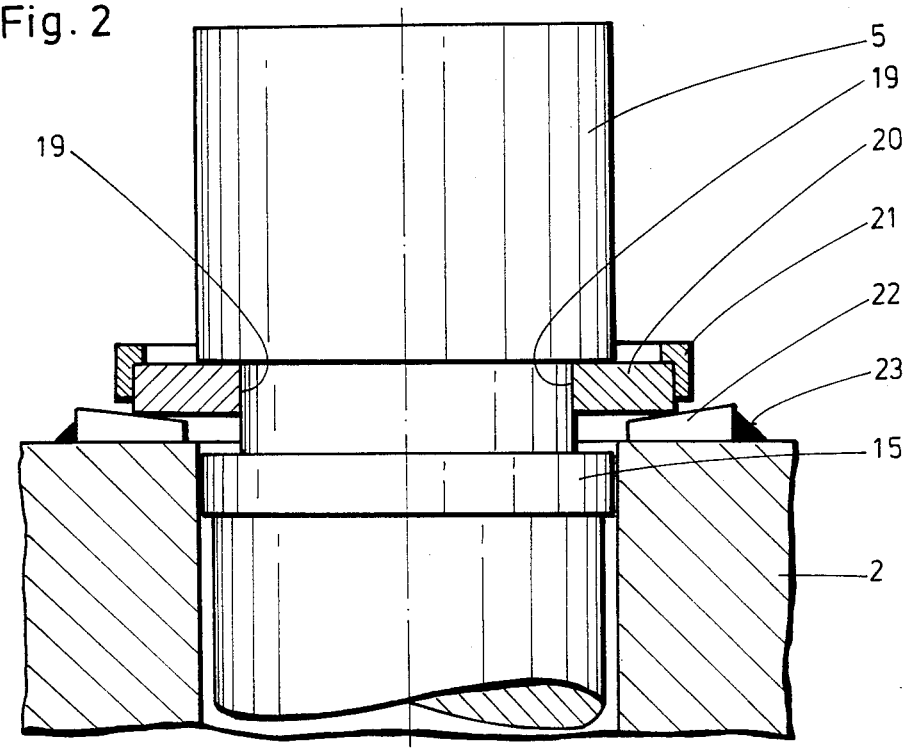
FIG. 2 is a vertical section showing a modification of the example of FIG. 1.
Figure 3:
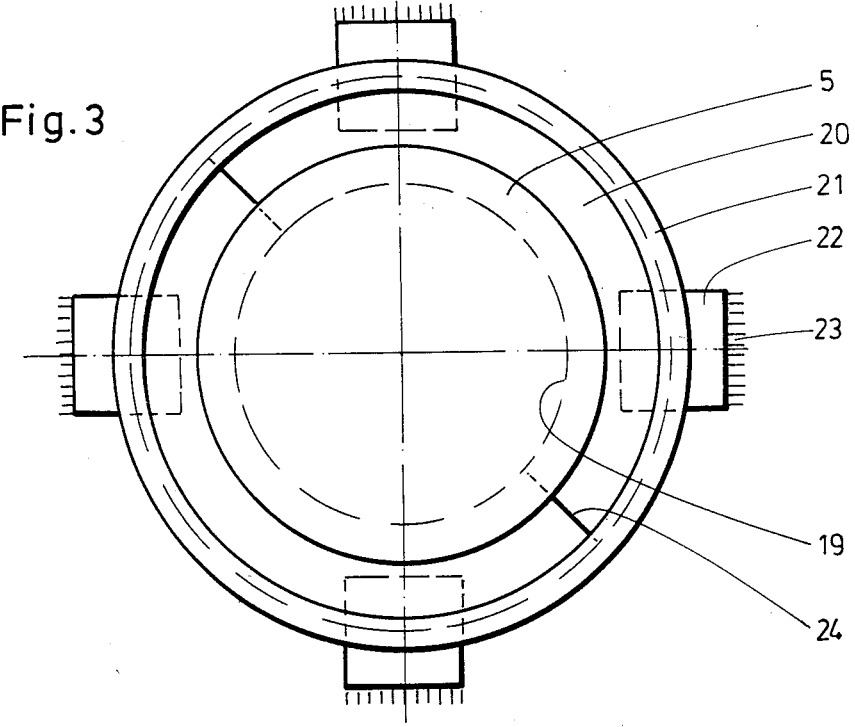
FIG. 3 is a plan view of the cylinder mounting shown in FIG. 2.

As already mentioned, the cylinder 5 may also be fixed under prestress against the upper face of the crosshead 2 remote from the blade carrier 7, not by the threaded ring 13, but, instead of this, by other fixing means, such as by means of a second divided ring 20 as shown in FIGS. 2 and 3, inserted into a second recess 19 in the outside of the cylinder. The second divided ring 20 is advantageously held together by means of a single-piece banding ring 21. The installation of the second divided ring 20 once again takes place under prestressing pressure by means of wedges 22 driven radially inwards.

In order to prevent loosening or releasing, each wedge 22 may be fixed, for example, with a weld 23. If the prestress is produced with a maximum cylinder force, higher operating forces, which could release this connection even if correctly installed, can never occur, so that a restressing facility is not necessary. FIG. 3 is a plan view of the head of the cylinder 5 for the case in which four wedges 22 serve for accepting the prestress of the cylinder. FIG. 3 also shows the mutual relationship of the divided ring 20 and the banding ring 21 and the separating joints 24 of the divided ring.

Figure 4:
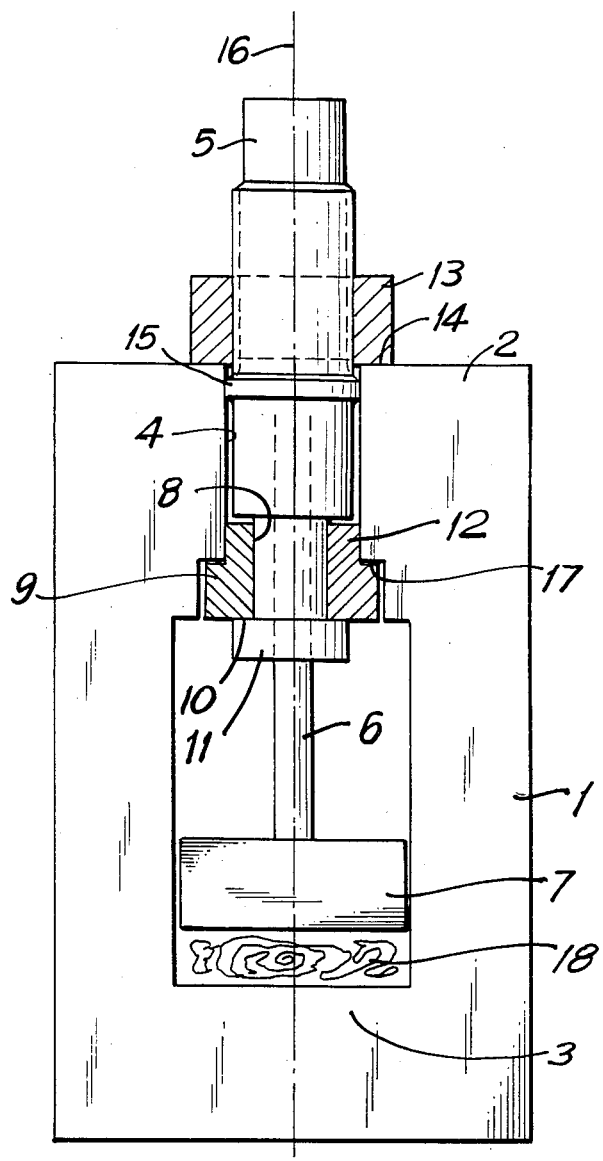
FIG. 4 is a vertical section through another example of the present invention.

In FIG. 4 another example of the invention is illustrated, similar to FIG. 1, however, a shoulder 17 is formed in the opening 4 with a corresponding shoulder formed on the stepped circumferential surface of the device ring 9 bearing against it. As distinguished from the example in FIG. 1, in FIG. 4 the divided ring 9 is completely recessed within the opening 4.

Figure 5:
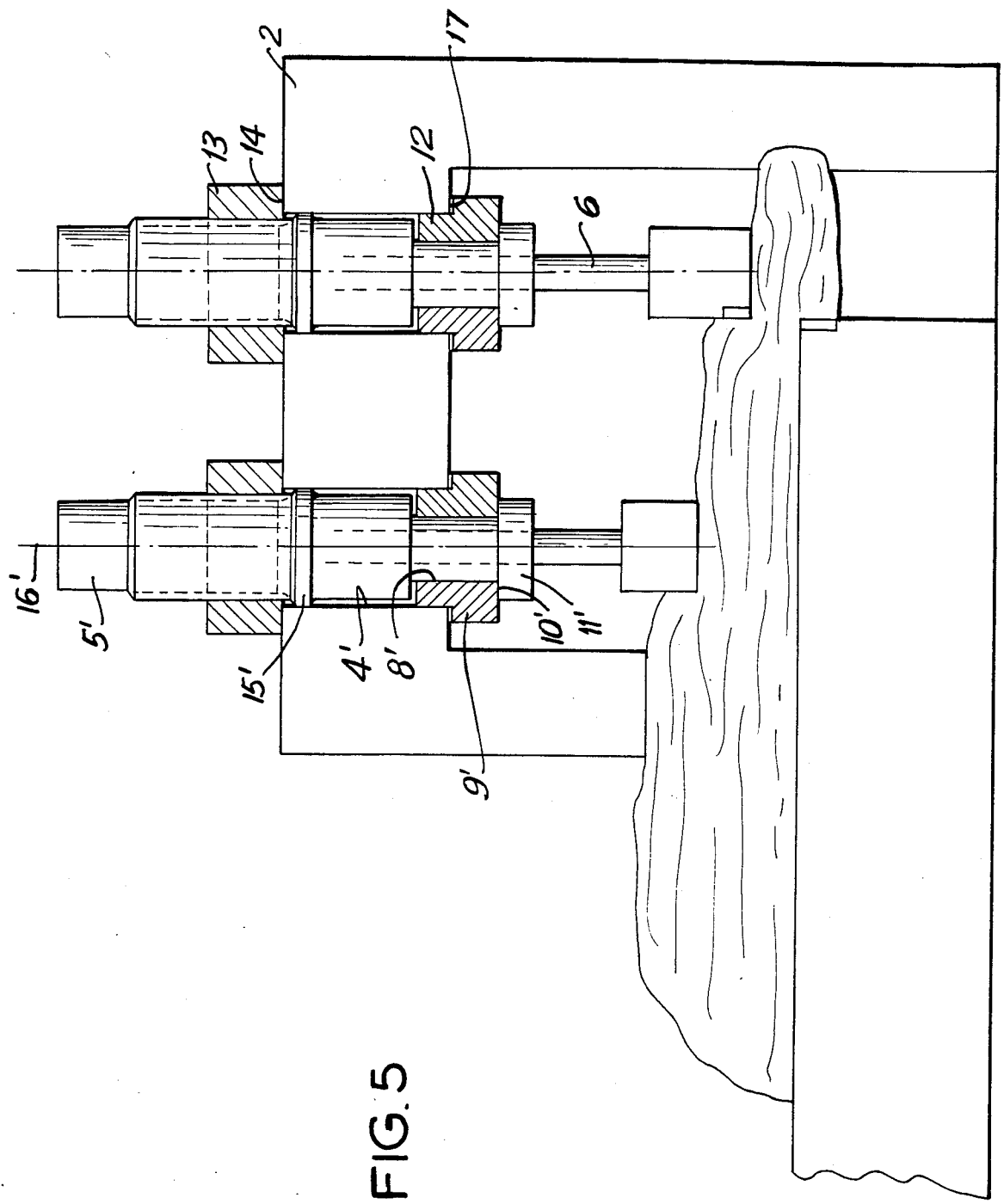
FIG. 5 is a vertical section similar to FIGS. 1 and 4 but viewed in a plane at right angles to the plane viewed in FIGS. 1 and 4 and illustrating a holding down device.

In FIG. 5 a holding down cylinder 5' is shown spaced laterally from the shearing cylinder 5 for holding the material while it is being sheared. The holding down cylinder 5' is similar to the shearing cylinder 5 and its individual parts are identified with the same reference numerals with the addition of a prime (').

I claim:

1. In a shearing machine for cutting up miscellaneous material, for example, metal scrap, waste, refuse, bars, rope, or the like, said shearing machine including a closed frame, said frame including a crosshead, a shearing blade carrier, means slidably guiding said carrier for reciprocating movement in said closed frame, and drive means for reciprocating said blade carrier, said drive means including a cylinder-piston assembly having an axis extending in the direction of the reciprocating movement of said carrier and fixing means fixing said cylinder-piston assembly in an opening through said crosshead, the improvement wherein said fixing means comprises that said crosshead having at least one first surface located around the opening therethrough and facing said blade carrier and a second surface located around the opening therethrough and facing in the opposite direction to said first surface, means defining a circumferential recess in the outside of said cylinder-piston asembly encircling the axis thereof, a divided ring fitting in said circumferential recess, and also fitting at least partly in said opening through said crosshead, said divided ring bearing against said at least one first surface of said crosshead to support said cylinder-piston assembly against reaction forces from said blade carrier towards said crosshead, and clamping means fixing said cylinder-piston assembly on said second surface of said crosshead, said clamping means bearing against said second surface of said crosshead with a prestressing force whereby said crosshead is prestressingly clamped between said divided ring and said clamping means.

2. A machine as claimed in claim 1, in which said clamping means comprises a screwthread on the outside of said cylinder-piston assembly and a screw-threaded ring screwed onto said screwthread on said cylinder-piston assembly into contact with said second surface of said crosshead.

3. A machine as claimed in claim 1, in which said recess in the outside of said cylinder-piston asembly extends partly into said opening through said crosshead and said divided ring further comprising a reduced-diameter portion extending into said opening.

4. A machine as claimed in claim 3, wherein said reduced-diameter portion is a close fit around said cylinder-piston assembly and is a close fit within said opening through said crosshead, whereby said reduced-diameter portion acts to center said cylinder-piston assembly in said opening.

5. A machine as claimed in claim 1, wherein said at least one first surface includes an annular first surface shoulder located within the opening through said crosshead, and said divided ring is completely recessed within said opening through said crosshead and is supported against said first surface shoulder.

6. A machine as claimed in claim 2, wherein said screwthreaded ring has a flat face directed towards said crosshead, said flat face bearing upon a flat said second surface upon said crosshead surrounding said opening through said crosshead, and said cylinder-piston assembly further comprising a surrounding collar adjacent said screwthreaded ring, said surrounding collar fitting in said opening through said crosshead to center said cylinder-piston assembly in said opening adjacent said screwthreaded ring.

7. A machine as claimed in claim 1, in which said clamping means comprises means defining a second circumferential recess in the outside of said cylinder-piston assembly, a second divided ring fitting in said second circumferential recess and means prestressingly acting between said second divided ring and said second surface of said crosshead.

8. A machine as claimed in claim 7, further comprising a single-piece banding ring surrounding said second divided ring and holding said second divided ring in said second recess.

9. A machine as claimed in claim 7, wherein said means prestressingly acting between said second divided ring and said second surface of said crosshead remote from said blade carrier comprises a plurality of wedges driven radially inwards between said second divided ring and said crosshead and securing means holding said wedges against release.

10. A machine as claimed in claim 9 in which said securing means comprises welds welding said wedges to said crosshead.

11. A shearing machine as claimed in claim 1, further comprising a holding down device and a second drive for said holding down device, said second drive comprising a second cylinder-piston assembly and second fixing means fixing said second cylinder-piston assembly in a second opening through said crosshead, said second fixing means comprising means defining a further circumferential recess in the outside of said second cylinder-piston assembly, a further divided ring fitting in said further circumferential recess and also extending at least partly into said second opening and second clamping means fixing said cylinder-piston assembly on said second surface of said crosshead, said second clamping means bearing with a prestress against said second surface of said crosshead.

* * * * *